(12) United States Patent
Wagner et al.

(10) Patent No.: US 6,899,077 B2
(45) Date of Patent: May 31, 2005

(54) METHOD FOR OPERATING A MULTIPLE INJECTION INTERNAL COMBUSTION ENGINE IN THE STARTING PHASE

(75) Inventors: Jens Wagner, Stuttgart (DE); Karsten Kroepke, Ludwigsburg (DE); Andreas Kufferath, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/474,358

(22) PCT Filed: Dec. 5, 2002

(86) PCT No.: PCT/DE02/04452

§ 371 (c)(1),
(2), (4) Date: Oct. 9, 2003

(87) PCT Pub. No.: WO03/067062

PCT Pub. Date: Aug. 14, 2003

(65) Prior Publication Data

US 2005/0011484 A1 Jan. 20, 2005

(30) Foreign Application Priority Data

Feb. 9, 2002 (DE) .......................................... 102 05 494

(51) Int. Cl.⁷ ................................. F02B 3/12; F02B 3/02
(52) U.S. Cl. ....................... 123/295; 123/299; 123/305; 123/491
(58) Field of Search ................................. 123/276, 295, 123/298, 299, 300, 305, 478, 480, 491; 701/104, 105, 113; 60/284, 285, 286

(56) References Cited

U.S. PATENT DOCUMENTS

| | | | | |
|---|---|---|---|---|
| 5,937,822 A | * | 8/1999 | Nakajima | 123/295 |
| 6,044,642 A | * | 4/2000 | Nishimura et al. | 123/295 |
| 6,213,086 B1 | * | 4/2001 | Chmela et al. | 123/276 |
| 6,318,074 B1 | * | 11/2001 | Nishimura et al. | 60/284 |
| 6,374,798 B1 | * | 4/2002 | Nagai et al. | 123/295 |
| 6,510,834 B1 | * | 1/2003 | Tomita et al. | 123/295 |
| 6,619,254 B2 | * | 9/2003 | Chmela et al. | 123/305 |

FOREIGN PATENT DOCUMENTS

| | | |
|---|---|---|
| EP | 0856655 | 8/1998 |
| EP | 0982489 | 3/2000 |
| EP | 1006265 | 6/2000 |
| EP | 1081364 | 3/2001 |
| EP | 1083327 | 3/2001 |

* cited by examiner

Primary Examiner—Willis R. Wolfe, Jr.
(74) Attorney, Agent, or Firm—Walter Ottesen

(57) ABSTRACT

The aim of the invention is to reduce exhaust emission during the staring phase of a direct-injection internal combustion engine. For this purpose, at least one first injection per working cycle takes place when the internal combustion engine is cold, especially during the starting and/or warm-up phase, thereby producing a substantially homogeneous, combustible fuel/air mixture (56) in the combustion chamber (12). In the same working cycle at least one further injection is supposed to take place which produces a substantially rich fuel/air mixture (64) in the zone of the ignition device (34). The lambda value of the fuel/air mixture (64) produced by the second injection in the zone of the ignition device (34) is smaller than the lambda value of the fuel/air mixture (56) present in the remaining combustion chamber.

26 Claims, 3 Drawing Sheets

METHOD FOR OPERATING A MULTIPLE INJECTION INTERNAL COMBUSTION ENGINE IN THE STARTING PHASE

RELATED APPLICATION

This application is the national stage of PCT/DE 02/04452, filed Dec. 5, 2002, designating the U.S., which is based on German patent application 102 05 494.0, the entire contents of which are incorporated herein by reference.

FIELD OF THE INVENTION

The invention relates first to a method for operating an internal combustion engine wherein fuel is injected directly into a combustion chamber of the engine and an air/fuel mixture, which is present in the combustion chamber, is ignited by an ignition device.

BACKGROUND OF THE INVENTION

A method of this kind is known from the marketplace. In this method, the fuel is conveyed by fuel pumps at high pressure into a fuel collecting line (rail). Injectors are connected to the fuel collecting line and these injectors inject the fuel directly into a combustion chamber assigned to the corresponding injector. In this way, a so-called stratified air/fuel mixture can be generated in the combustion chamber in specific operating states of the engine. This air/fuel mixture can, overall, be leaner than a homogeneously distributed air/fuel mixture so that an engine operated in this manner consumes comparatively little fuel.

During operation of such an internal combustion engine, and for a cold engine, the problem is present that a portion of the fuel condenses on the cold combustion chamber walls or is deposited directly as liquid on the wall. Without corresponding countermeasures, for example, when starting a cold engine, the air/fuel mixture, which is present in the combustion chamber, would be so lean that it could not be ignited.

This is countered in that basically for a cold internal combustion engine, more fuel is injected into the combustion chamber of the engine than is required in normal operation for forming an ignitable and combustible air/fuel mixture. The fuel quantity, which arrives in the combustion chamber of the engine when the engine is cold, can, in this way, easily be five to thirty times the fuel quantity required in normal operation.

This excessive fuel, which condenses on the combustion chamber walls or deposits directly as liquid, is, for the most part, discharged uncombusted into the exhaust-gas system of the engine. In an operation of the engine of this kind, very high hydrocarbon emissions are generated. These high hydrocarbon emissions during the start phase, restart phase and warm-up phase contribute significantly to the total exhaust-gas emissions during the operation of the engine. A reduction of these emissions can therefore significantly reduce the total emissions of the engine. At the same time, the introduced additional quantity contributes to an increased fuel consumption in the cold start phase.

An internal combustion engine is known from U.S. Pat. No. 6,390,059 which can be started in stratified operation. This means that an ignitable and combustible mixture is only present in the region of the spark plug; whereas, in the remaining combustion chamber and especially also in the vicinity of the cold cylinder walls, an extremely lean mixture or even only pure air is present. In this way, damaging exhaust-gas emissions can be reduced during the start phase of the engine.

In order to start an internal combustion engine in stratified operation, a mixture cloud separated sharply from the surrounding air must arise in the charge stratification. For this purpose, a very special injector is, for example, necessary. This injector is, however, complex and expensive and cannot be retrofitted.

An additional problem occurs especially when a cold engine is operated only for a short time after a start or does not become warm for other reasons. In the next start of the engine, so-called spark fouling can occur primarily for very cold temperatures (<00) because of the large injected fuel quantities. This is understood to mean that the spark plug of a combustion chamber of the engine as well as the entire combustion chamber becomes so damp because of the large introduced fuel quantity that ignition problems occur and, in the worst case, a reliable start of the engine is no longer possible.

SUMMARY OF THE INVENTION

The task of the present invention is therefore to so improve a method of the kind mentioned initially herein that, with this method, the fuel consumption and the exhaust-gas emissions during the start phase and/or warm-up phase of the engine can be reduced in a cost-effective manner and that the engine can always be reliably started.

This task is solved with the method of the type described initially herein in that, for a cold engine and especially during a start phase and/or warm-up phase of the engine, at least a first injection takes place per work cycle with which overall in the combustion chamber an essentially homogeneous, combustible air/fuel mixture is generated and that, thereafter, a second injection takes place in the same work cycle with which an essentially rich air/fuel mixture is generated in the region of the ignition device and that the lambda value of the air/fuel mixture, which is generated by the second injection of the region of the ignition device, is less than the lambda value of the air/fuel mixture present in the remaining combustion chamber.

The method of the invention affords the advantage that the internal combustion engine, which is driven therewith, requires only a small excess of fuel primarily during the start phase and during the warm up and therefore less fuel is consumed and less toxic emissions are caused than was previously possible. In that, overall, less fuel is introduced into the combustion chamber, the spark plug becomes less moist which reduces the risk of spark fouling and makes possible a reliable restart after only a short operating time. Furthermore, the method of the invention can be applied in many types of engines having fuel direct injection because the function of the method is independent of the special configuration of the combustion chamber within wide limits or is independent of the configuration of the injector.

The advantages are, inter alia, achieved in that for cold internal combustion engines, for example, during the start of the engine (usually the first few rotations of a crankshaft) and/or during the warm-up phase of the engine (until this engine has reached a specific temperature), the fuel injection within a work cycle is divided into at least two individual injections spaced from each other in time.

The term "work cycles" refers to a combustion chamber of the engine. In the case of a four-stroke engine, a work cycle includes all four strokes, that is, two complete crankshaft revolutions. The first injection takes place in that an air/fuel mixture is injected into the combustion chamber which is essentially homogeneous and just still combustible. A rich air/fuel mixture, which is also well ignitable even for a cold engine, is generated only with the second injection and only in the region of the ignition device.

For this reason, the homogeneous base mixture, which is generated for the first injection, is less rich than was previously the case. As a consequence, only comparatively little fuel can condense on the walls of the combustion chamber or deposit directly as fluid so that the so-called "wall losses" are comparatively low and the spark plug becomes less moist. The additional fuel quantity, which is injected into the combustion chamber of the engine during these phases, can thereby be reduced which lowers the fuel consumption. In this way alone, the portion of the uncombusted fuel, which reaches the exhaust-gas system, is reduced which, in turn, leads to a reduction of the hydrocarbon emissions during the start phase of the engine.

Compared to the usual stratified air/fuel mixture in the combustion chamber of the engine, the method of the invention affords the advantage that a combustible mixture is present in the entire combustion chamber. In this way, after a completed ignition of the rich air/fuel mixture present in the region of the ignition device, the total air/fuel mixture, which is present in the combustion chamber of the engine, can thoroughly combust. This leads again to a considerable reduction of the hydrocarbon emissions during this operating phase of the engine and to a more rapid warming of the combustion chamber than would be the case in the above-mentioned stratified start.

Because of the fact that during the start phase a rich air/fuel mixture is present in the region of the ignition device (this mixture is generated by the second injection), a very good start capability and/or cold running capability of the engine is ensured.

The method of the invention furthermore affords the possibility to shift the ignition angle in the retard direction for colder temperatures of the engine because the ignitability of the mixture is ensured also at low temperatures of the engine. The poor mechanical efficiency, which is caused by a retarded ignition angle, accelerates the heating up of the combustion chamber and so improves the reliability for repeated cold starts. The cold engine runs more quietly and therefore more comfortably because the probability of ignition misfires or delayed combustion is reduced.

Accordingly, a method is claimed, for example, wherein a temperature of the engine, especially a coolant temperature, cylinder head temperature or lubricant temperature is detected and the injection is only then subdivided into a first injection and into a second injection when the detected temperature lies below a specific value. In this way, the subdivided injection is limited to those cases wherein the subdivided injection is needed to prevent the start and emission problems. For a warm internal combustion engine, however, other methods optimal for this case could be used (for example, purely homogeneous operation). Here, it is also conceivable that for the partitioned injection during start on the one hand, and during warm-up on the other hand, different temperature limit values apply. The limit value for the warm-up running should usually be less than the limit value for the start of the engine. It is also conceivable that the injection is only subdivided into a first and a second injection when the detected temperature lies within a range limited upwardly and downwardly.

Furthermore, it can be provided that the injection is only subdivided into a first injection and into a second injection when a detected rpm of a crankshaft of the engine lies below a specific value or lies within specific limits.

In an especially advantageous configuration of the method of the invention, the air/fuel mixture, which is generated in the first injection, is homogeneously lean and has, especially, a lambda value in the range of approximately 1.5 to 4. This is based on the idea that, in the first injection, only so much fuel need be injected into the combustion chamber that the homogeneous air/fuel mixture cloud, which is generated by this injection into the combustion chamber, is just combustible, that is, a reliable complete combustion is ensured. An ignitability is not necessary in this region because the ignition is ensured by the mixture cloud which is introduced by the second injection. A homogeneous-lean base mixture makes it possible to start the engine with an overall mixture lying about the stoichiometric point, that is, while also considering the mixture cloud present in the region of the ignition device. The fuel consumption of an internal combustion engine operated in this manner is therefore comparatively low with overall low emissions.

Furthermore, it is suggested that the air/fuel mixture, which is generated with the second injection in the region of the ignition device, has a lambda value in the range of 0.70 to 0.95 in the mixture at least for the first work cycle. An air/fuel mixture of this kind ignites reliably.

It is also suggested that the fuel quantity, which is injected into the combustion chamber during the start phase of the engine in the first injection and/or in the second injection, is dependent upon the number of already completed work cycles. This improvement of the method of the invention takes into account that a warming of the combustion chamber walls takes place very rapidly during the start phase of the engine and therefore leads to a reduction of the wall losses.

Because of the warming of other components of the engine, the temperature of the air/fuel mixture, which is in the combustion chamber, also increases very rapidly at the ignition time point. The injection of fuel which is excessive and which is necessary in order to achieve the wanted composition of the air/fuel mixture can thereby be very rapidly reduced.

In a special configuration of the method of the invention, it is suggested that the first injection take place at the start of an induction stroke and the second injection take place toward the end of a compression stroke of a work cycle. A time point at the start of an induction stroke for the first injection facilitates the formation of a homogeneous base mixture. On the other hand, the second injection only toward the end of the compression stroke makes possible the formation of a relatively small mixture cloud in the region of the ignition device. Preferably, the second injection takes place at a crankshaft angle of approximately 800 to 300 ahead of the ignition.

In one configuration of the invention, the divided injection only takes place when the pressure in a fuel system, which makes the fuel available, reaches at least a specific value. In this way, it is considered that in some common rail systems, which are used for fuel-direct injection, the pressure in the rail is reduced during standstill of the engine, for example, for reasons of safety. When starting, only a slight fuel pressure is available which permits only a conventional homogeneous injection of the fuel. However, as soon as sufficient fuel pressure is present, there can be a transfer to the divided injection.

After the end of the start phase, a switchover can again take place to a conventional operating method for the engine. For this reason, it is also suggested that only one injection per work cycle take place after a specific number of work cycles and/or when reaching a specific operating temperature. Specifically, a switchover of this kind takes place, for example, after two to four work cycles per cylinder or as soon as only a slight enrichment is necessary.

A further improvement relates to a method in which the total composition of the air/fuel mixture, the rail pressure, the injection time point and/or the fuel quantity to be injected are dependent upon the instantaneous operating conditions, such as the temperature of the engine, load, and rpm. This makes possible a renewed optimization of the following: emission performance, fuel consumption and repeat start performance.

The invention relates also to a computer program which is suitable for carrying out the above method when it is executed on a computer. Here, it is especially preferred when the computer program is stored on a memory, especially on a flash memory.

Furthermore, the invention relates to a control apparatus (open loop and/or closed loop) for operating an internal combustion engine which includes a memory on which a computer program of the above kind is stored.

The subject matter of the invention is also an internal combustion engine having: a combustion chamber; a fuel injection device which injects the fuel directly into the combustion chamber; and, an ignition device which ignites an air/fuel mixture present in the combustion chamber.

In order to reduce the fuel consumption and the exhaust-gas emission in such an internal combustion engine during the start phase and in order to be able to build such an engine simply and cost effectively, it is suggested that the engine includes a control apparatus (open loop and/or closed loop) which so drives the fuel injection device during a start phase of the engine that, per work cycle, at least a first injection takes place with which, overall, an essentially homogeneous combustible air/fuel mixture is generated in the combustion chamber and that, thereafter, in the same work cycle, at least a second injection takes place with which an essentially rich air/fuel mixture is generated in the region of the ignition device and that the lambda value of the air/fuel mixture, which is generated by the second injection in the region of the ignition device, is less than the lambda value of the air/fuel mixture present in the remainder of the combustion chamber.

Advantageously, the internal combustion engine is equipped with a control apparatus (open loop and/or closed loop) of the above-mentioned type.

BRIEF DESCRIPTION OF THE DRAWING

The invention will now be explained with reference to the drawings wherein.

DESCRIPTION OF THE PREFERRED
EMBODIMENTS OF THE INVENTION

Figure 1:
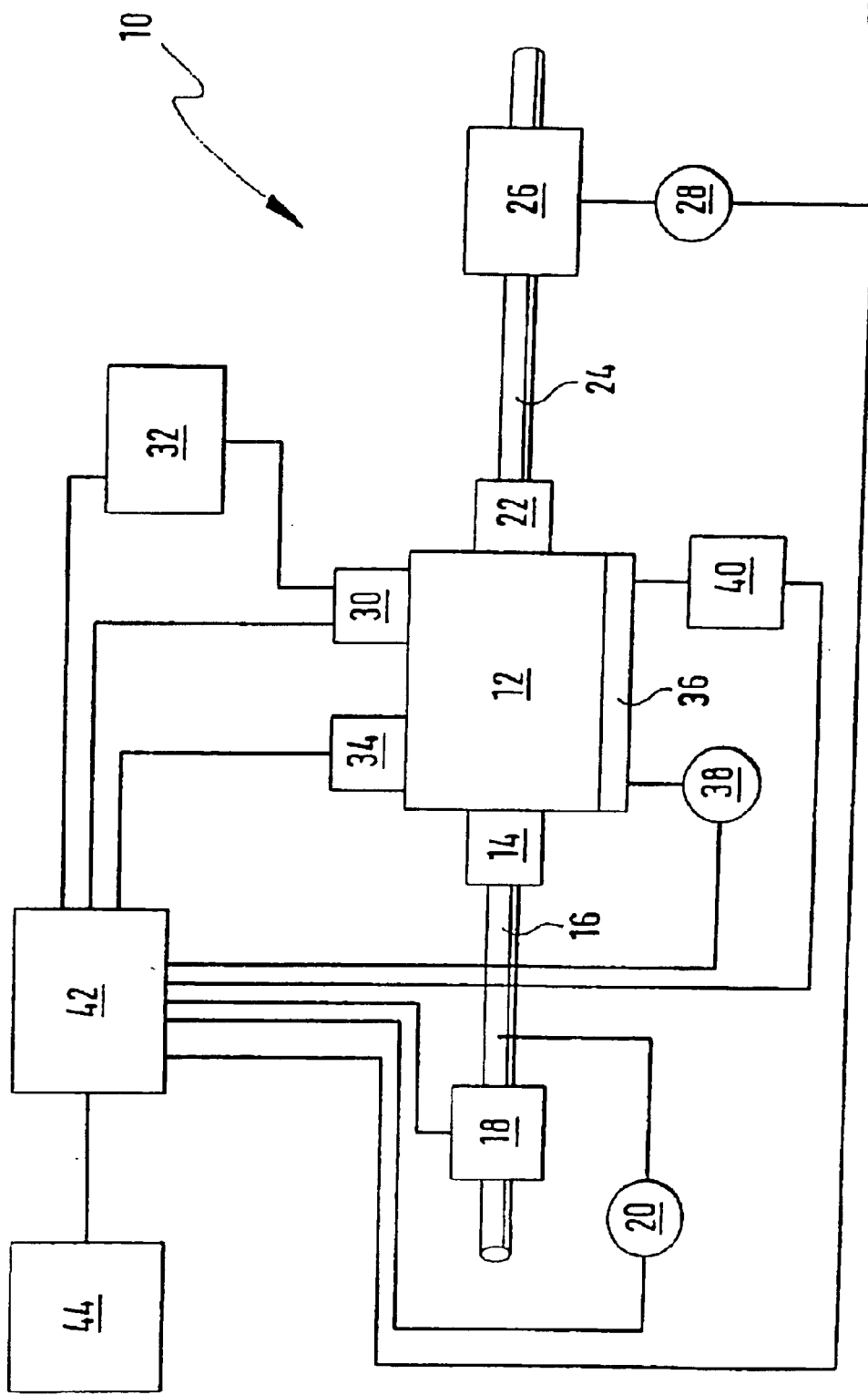
FIG. 1 is a schematic of an internal combustion engine.

FIG. 1, an internal combustion engine overall is identified by reference numeral 10. The engine includes several combustion chambers of which only one is shown in FIG. 1 having the reference numeral 12. The combustion air is supplied to the combustion chamber 12 from an intake manifold 16 via an inlet valve 14. A throttle flap 18 is mounted in the intake manifold 16. The air mass, which flows through the intake manifold 16, is detected by a hot-film air-mass sensor (referred to as HFM sensor). A pressure sensor can also be used for detecting the air mass. The pressure sensor has the reference numeral 20. The hot combustion exhaust gases are directed out of the combustion chamber 12 into an exhaust-gas pipe 24 via an outlet valve 22. A catalytic converter 26 having a lambda probe 28 is mounted in the exhaust-gas pipe 24.

The fuel arrives in the combustion chamber 12 via an injector 30 mounted directly at the combustion chamber 12. The injector 30 is connected to a fuel system 32. Even though this is not shown in FIG. 1, the fuel system 32 includes a low pressure presupply pump and a high pressure primary supply pump which pump the fuel from a supply vessel into a fuel collecting line (known as a "rail"). The injector 30 is, in turn, connected to the fuel collecting line. The ignition of an air/fuel mixture, which is present in the combustion chamber 12, takes place via a spark plug 34.

The rpm of a crankshaft 36 is detected by an rpm sensor 38. A starter 40 can impart rotation to the crankshaft 36 to start the internal combustion engine 10.

The operation of the engine 10 is controlled (open loop and/or closed loop) by a control apparatus 42. The control apparatus receives signals from the following: the HFM sensor 20, the rpm sensor 38 and the lambda probe 28. Furthermore, the control apparatus 42 is connected to an ignition switch 44. At the output end, the control apparatus 42 is connected to the throttle flap 18, the spark plug 34 and the injector 30. The starter 40 is also driven by the control apparatus 42. A connection is present also between the fuel system 32 and the control apparatus 42.

The start operation of the internal combustion engine 10 is now explained with reference to FIGS. 2 to 4.

Figure 2:
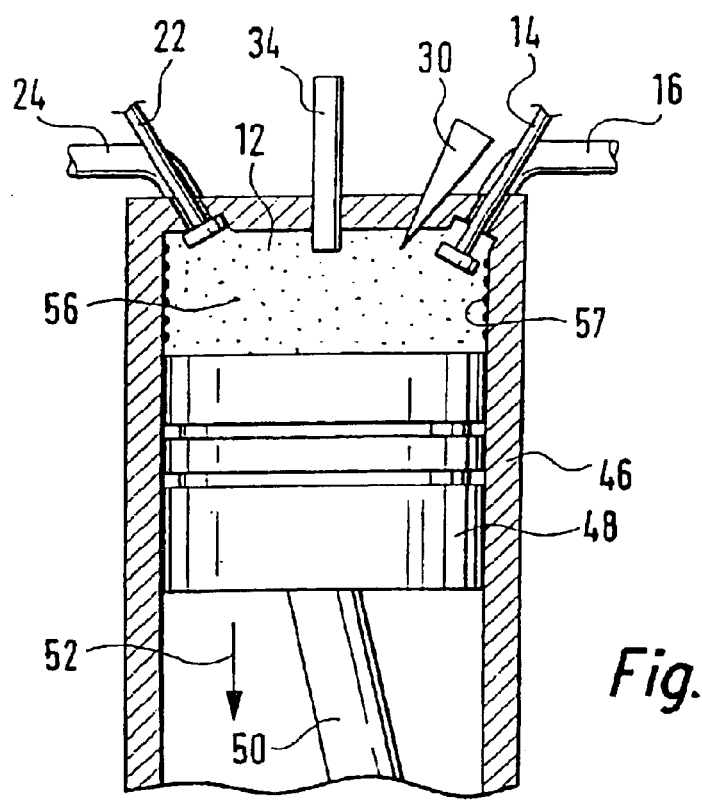
FIG. 2 is a partial section through a combustion chamber of the internal combustion engine of FIG. 1 after a first injection of fuel.
Figure 3:
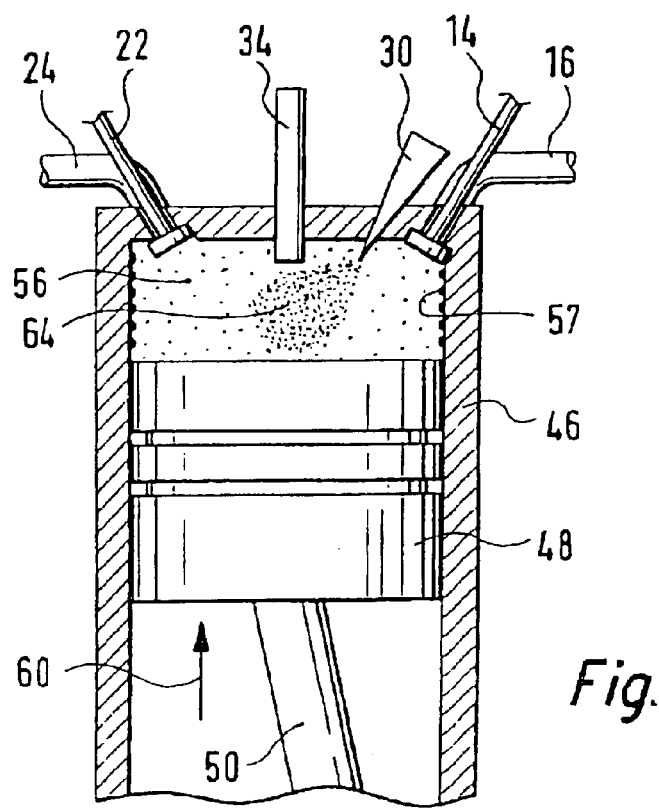
FIG. 3 is a schematic similar to FIG. 2 of a second injection of fuel.

In FIGS. 2 and 3, a cylinder housing 46 is shown wherein a piston 48 is movably accommodated. The piston 48 is connected to a crankshaft 36 (not shown in FIGS. 2 and 3) via a connecting rod 50. The combustion chamber 12 is formed between the piston 48 and the cylinder housing 46. FIGS. 2 and 3 also show the inlet valve 14, the outlet valve 22, the spark plug 34, the injector 30 as well as the intake manifold 16 and the exhaust-gas pipe 24.

In order to start the internal combustion engine 10 (the control apparatus 42 receives a corresponding signal from the ignition switch 44), the starter 40 is actuated and the crankshaft 36 is thereby set into motion. During an induction stroke (see FIG. 4), the piston 48 moves downwardly in the cylinder housing 46 in FIG. 2 (arrow 52 in FIG. 2). The inlet valve 14 is opened (reference numeral 52 in FIG. 4). At the start of this induction stroke, a first injection of fuel into the combustion chamber 12 takes place via the injector 30. The time span of this injection is identified by reference numeral 54 in FIG. 4. With this injection, an overall essentially homogeneous air/fuel mixture 56 is generated in the combustion chamber 12.

With this first injection, a relatively large quantity of fuel (reference numeral 57) condenses on the cylinder housing 46, which is still cold, and on the piston 48. A portion of the fuel can also be directly deposited on the wall. In order to compensate for this, in total more fuel is injected into the combustion chamber 12 by the injector 30 than in the normal case, that is, more fuel than would be necessary for a warm cylinder housing 46 and piston 48.

After passing bottom dead center, the piston 48 again moves upwardly (arrow 60 in FIG. 3). The inlet valve 14 is now likewise closed as is the outlet valve 22. Toward the end of this compression stroke (see FIG. 4), a second injection of fuel takes place via the injector 30. With this injection (reference numeral 62 in FIG. 4), a fuel cloud 64 is generated in the region of the spark plug 34 via which an essentially rich air/fuel mixture arises in the region of the spark plug 34. The homogeneous-lean air/fuel mixture 56, which is generated with the first injection 54 into the combustion chamber 12, has a lambda value in the range of approximately 1.5 to 4. The rich air/fuel mixture 64, which is generated by the second injection 52 in the region of the ignition device 34, has a lambda value in this first operating cycle of the piston 48 in the range of approximately 0.75 to 0.9.

Figure 4:
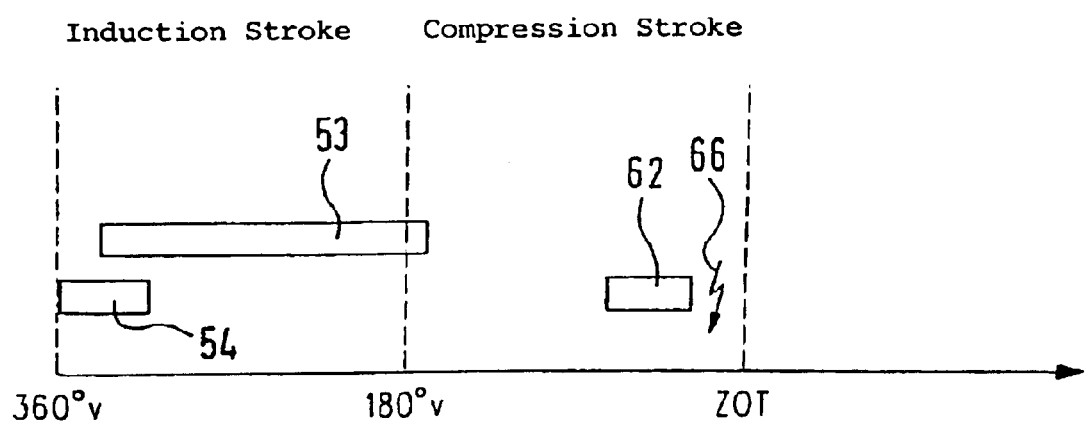
FIG. 4 is a diagram wherein the time spans of the injections of FIGS. 1 and 2 as well as the opening times of an injection valve of the engine are shown as a function of the angle of a crankshaft.

Shortly before the piston 48 reaches top dead center, the spark plug 34 is ignited (reference numeral 66 in FIG. 4). In this way, the rich air/fuel mixture 64, which is present in the region of the spark plug 34, is ignited (in an embodiment not shown, the ignition takes place only after top dead center). Because of the previous pressure increase and temperature increase, the flame propagation is better and the through combustion cleaner. This jumps over to the homogeneous mixture 56 which is likewise present in the combustion chamber 12 so that this mixture can completely combust.

Since the base mixture 56, which is present in the combustion chamber 12, is lean compared to the undivided injection, only little fuel 57 condenses overall on the inner wall of the cylinder housing 46. The so-called wall losses are therefore comparatively low. A rich air/fuel mixture is present only in the region of the spark plug 34 in the method described in FIGS. 2 to 4 whereas a homogeneous-lean air/fuel mixture 56 is present in the remaining combustion chamber 12. For this reason, the total lambda of the total air/fuel mixture in the combustion chamber 12 is leaner than for an undivided injection.

The method shown in FIGS. 2 to 4, wherein a first injection 54 takes place at the start of the induction stroke and the second injection 62 takes place toward the end of the compression stroke, is carried out in the present embodiment for the first four work cycles during the start phase of the engine 10. The number of start cycles is determined via the rpm sensor 38.

A precise detection of the air quantity, which reaches the combustion chamber 12, via the HFM sensor 20 is not possible because of the low rpm and the corresponding low air speed. For this reason, the air mass is precontrolled which is to be injected into the combustion chamber 12 during the start phase (that is, during the first four work cycles) of the engine by the injector 30. In this way, the fuel quantity can be determined, for example, from a characteristic field in dependence upon a temperature of the engine 10 and in dependence upon the running number of the work cycle of the engine 10.

In order to compensate the condensation or deposit of the fuel 57 on the cold wall of the cylinder housing 46 and on the piston 48, an excessive quantity of fuel is injected by the injector 30 into the combustion chamber 12 during the start phase of the engine 10. Otherwise, the wanted composition, especially of the homogeneous-lean air/fuel mixture 56, which results from the first injection 54, could not be achieved.

However, the temperature of the cylinder housing 46 and of the piston 48 are significantly increased already after the first combustion in the combustion chamber 12. For this reason, the quantity of the excessive fuel, which is injected during the second work cycle of the particular cylinder of the engine 10 by the injector 30 into the combustion chamber 12, is reduced compared to the first work cycle. A further reduction takes place from the second work cycle to the third work cycle and from the third work cycle to the fourth work cycle. In the present embodiment, the start phase of the engine 10 is completed after the fourth work cycle of the piston 48 and then only one injection per work cycle takes place. For very low temperatures of the engine, an operation with divided injection can bring advantages up to reaching a specific temperature because the enrichment is less.

The fuel pressure, which is necessary for the injections 54 and 62, is reached via a corresponding driving of the fuel system (for example, a running of an electric fuel pump or driving of a pressure store). For short switch off times, the still present pressure in the fuel system can also be utilized.

Alternatively, even after the run-up of the engine, there can be a switchover to the divided injection as soon as a sufficient fuel pressure can be made available. This procedure offers, above all, advantages for very cold starting temperatures because a very large enrichment would be necessary also for a longer time after the run-up of the engine. This can be reduced by the divided injection.

For very cold combustion chamber temperatures, a comparatively large amount of fuel is condensed on the wall of the combustion chamber and on the piston. For this reason, in these cases, it is conceivable to deposit only a simple injection during the first combustions. For example, after the first or second combustion of each cylinder, there would be a switchover to a divided injection.

What is claimed is:

1. A method for operating an internal combustion engine having a crankshaft and wherein fuel is injected directly into a combustion chamber of the engine and an air/fuel mixture, which is present in the combustion chamber, is ignited by an ignition device, the method comprising the steps of:

for a cold engine, during a start phase, providing a first injection per work cycle with the first revolutions of said crankshaft to generate an essentially homogeneous combustible air/fuel mixture in said combustion chamber;

thereafter, in the same work cycle, providing a second injection to generate an essentially rich air/fuel mixture in the region of said ignition device; and, making the lambda value of the air/fuel mixture generated by said second injection in the region of said ignition device less than the lambda value of the air/fuel mixture present in the remainder of said combustion chamber.

2. The method of claim 1, comprising the further steps of:

detecting a temperature of the engine; and, only subdividing the injection into said first injection and into said second injection if the detected temperature lies below a predetermined value.

3. The method of claim 2, wherein the temperature detected is that of at least one of the following: a coolant, a cylinder head and a lubricant.

4. The method of claim 1, comprising the further step of only subdividing the injection into a first injection and into a second injection if a detected rpm of said crankshaft of said engine lies below a specific value or lies within predetermined limits.

5. The method of claim 2, wherein the air/fuel mixture, which is generated with said first injection, is homogeneous-lean and has a lambda value in the range of approximately 1.5 to 4.

6. The method of claim 2, wherein the air/fuel mixture, which is generated with said second injection in the region of said ignition device, has a lambda value in the range of approximately 0.7 to 0.95 at least during the first work cycle.

7. The method of claim 2, wherein the fuel quantity, which is injected into the combustion chamber during a cold start of the engine and/or during the start phase of the engine with said first injection and/or with said second injection, is dependent upon the number of the work cycles which has already taken place.

8. The method of claim 2, wherein said first injection takes place at the start of the induction stroke and the second injection takes place toward the end of the compression stroke of a work cycle.

9. The method of claim 2, wherein the divided injection is only carried out when the pressure in a fuel system, which makes the fuel available, reaches at least a specific value.

10. The method of claim 1, wherein only one injection per work cycle takes place after a specific number of work cycles and/or when reaching a specific operating temperature.

11. The method of claim 1, wherein the total composition of the air/fuel mixture, the rail pressure, the injection time points and/or the quantity of fuel to be injected are dependent upon the instantaneous operating conditions such as temperature of the engine, load and rpm.

12. A method for operating an internal combustion engine having a crankshaft and wherein fuel is injected directly into a combustion chamber of the engine and an air/fuel mixture, which is present in the combustion chamber, is ignited by an ignition device, the method comprising the steps of:

for a cold engine, providing a first injection per work cycle to generate an essentially homogeneous combustible air/fuel mixture in said combustion chamber;

thereafter, in the same work cycle, providing a second injection to generate an essentially rich air/fuel mixture in the region of said ignition device;

making the lambda value of the air/fuel mixture generated by said second injection in the region of said ignition device less than the lambda value of the air/fuel mixture present in the remainder of said combustion chamber;

in the first work cycles, providing one more injection;

only after a specific number of work cycles, subdividing the injection into a first injection and a second injection; and, determining said number of first work cycles from the temperature of said engine at the start time point.

13. The method of claim 12, comprising the further steps of:

detecting a temperature of the engine; and, only subdividing the injection into said first injection and into said second injection if the detected temperature lies below a predetermined value.

14. The method of claim 13, wherein the temperature detected is that of at least one of the following: a coolant, a cylinder head and a lubricant.

15. The method of claim 12, comprising the further step of only subdividing the injection into a first injection and into a second injection if a detected rpm of said crankshaft of said engine lies below a specific value or lies within predetermined limits.

16. The method of claim 13, wherein the air/fuel mixture, which is generated with said first injection, is homogeneous-lean and has a lambda value in the range of approximately 1.5 to 4.

17. The method of claim 13, wherein the air/fuel mixture, which is generated with said second injection in the region of said ignition device, has a lambda value in the range of approximately 0.7 to 0.95 at least during the first work cycle.

18. The method of claim 13, wherein the fuel quantity, which is injected into the combustion chamber during a cold start of the engine and/or during the start phase of the engine with said first injection and/or with said second injection, is dependent upon the number of the work cycles which has already taken place.

19. The method of claim 13, wherein said first injection takes place at the start of the induction stroke and the second injection takes place toward the end of the compression stroke of a work cycle.

20. The method of claim 13, wherein the divided injection is only carried out when the pressure in a fuel system, which makes the fuel available, reaches at least a specific value.

21. The method of claim 12, wherein only one injection per work cycle takes place after a specific number of work cycles and/or when reaching a specific operating temperature.

22. The method of claim 12, wherein the total composition of the air/fuel mixture, the rail pressure, the injection time points and/or the quantity of fuel to be injected are dependent upon the instantaneous operating conditions such as temperature of the engine, load and rpm.

23. A computer program comprising a program suitable for carrying out a method for operating an internal combustion engine when executed on a computer, the engine having a crankshaft and wherein fuel is injected directly into a combustion chamber of the engine and an air/fuel mixture, which is present in the combustion chamber, is ignited by an ignition device, the method including the steps of:

for a cold engine, during a start phase, providing a first injection per work cycle with the first revolutions of said crankshaft to generate an essentially homogeneous combustible air/fuel mixture in said combustion chamber;

thereafter, in the same work cycle, providing a second injection to generate an essentially rich air/fuel mixture in the region of said ignition device; and, making the lambda value of the air/fuel mixture generated by said second injection in the region of said ignition device less than the lambda value of the air/fuel mixture present in the remainder of said combustion chamber.

24. The computer program of claim 23, wherein said program is stored in a memory including a flash memory.

25. A control apparatus (open loop and/or closed loop) for operating an internal combustion engine having a crankshaft and wherein fuel is injected directly into a combustion chamber of the engine and an air/fuel mixture, which is present in the combustion chamber, is ignited by an ignition device, the control apparatus comprising a memory on which a computer program is stored, the program being suitable for carrying out a method for operating said internal combustion engine and the method including the steps of:

for a cold engine, during a start phase, providing a first injection per work cycle with the first revolutions of said crankshaft to generate an essentially homogeneous combustible air/fuel mixture in said combustion chamber;

thereafter, in the same work cycle, providing a second injection to generate an essentially rich air/fuel mixture in the region of said ignition device; and, making the lambda value of the air/fuel mixture generated by said second injection in the region of said ignition device less than the lambda value of the air/fuel mixture present in the remainder of said combustion chamber.

26. An internal combustion engine comprising:

a combustion chamber;

a fuel injection device for injecting the fuel directly into said combustion chamber;

an ignition device for igniting an air/fuel mixture present in said combustion chamber; and, a control apparatus (open loop and/or closed loop) having a memory on which a computer program is stored, the program being suitable for carrying out a method for operating said internal combustion engine and the method including the steps of:

for a cold engine, during a start phase, providing a first injection per work cycle with the first revolutions of said crankshaft to generate an essentially homogeneous combustible air/fuel mixture in said combustion chamber;

thereafter, in the same work cycle, providing a second injection to generate an essentially rich air/fuel mixture in the region of said ignition device; and, making the lambda value of the air/fuel mixture generated by said second injection in the region of said ignition device less than the lambda value of the air/fuel mixture present in the remainder of said combustion chamber.

* * * * *